United States Patent [19]

Shinoda et al.

[11] Patent Number: 4,822,211

[45] Date of Patent: Apr. 18, 1989

[54] METHOD AND APPARATUS FOR LAYING CABLE IN A PIPE

[75] Inventors: Yasuhiro Shinoda, Kashiwa; Yoshifumi Takahashi, Tokyo; Tsuneto Takaso, Tokyo; Akira Hagiwara, Tokyo; Yoshiaki Ishii, Tokyo, all of Japan

[73] Assignee: Nippon Hume Pipe Co., Ltd., Japan

[21] Appl. No.: 66,141

[22] Filed: Jun. 24, 1987

[30] Foreign Application Priority Data

Jun. 25, 1986 [JP]  Japan ................................. 61-148964

[51] Int. Cl.$^4$ ............................................... F16L 1/02
[52] U.S. Cl. ..................................... 405/154; 248/71; 405/132; 405/150
[58] Field of Search ............... 405/154, 156, 157, 146, 405/150, 132; 248/61, 58, 71, 74.1

[56] References Cited

U.S. PATENT DOCUMENTS

| 437,126 | 9/1890 | Loth | 405/132 X |
| 3,403,592 | 10/1968 | Larson | 248/71 X |
| 4,647,251 | 3/1987 | Gale | 405/154 |

Primary Examiner—Dennis L. Taylor
Attorney, Agent, or Firm—McGlew & Tuttle

[57] ABSTRACT

A cable is previously introduced into a pipe in which the cable is to be laid. A wagon is caused to move through the pipe and the cable is raised up with the aid of an arm disposed at the fore part of the wagon until it abuts against the inner wall of the pipe. The cable is then fixed to the inner wall of the pipe by using fixing means disposed at the rear part of the wagon.

3 Claims, 4 Drawing Sheets

METHOD AND APPARATUS FOR LAYING CABLE IN A PIPE

FIELD OF THE INVENTION AND RELATED ART STATEMENT

The present invention relates to method and apparatus for laying cable in a pipe and more particularly to method and apparatus for laying cable such as optical communication fiber cable or the like in a pipe having a relatively small inner diameter such as sewage branch pipe or the like wherein the cable, previously introduced into the pipe, subsequently is automatically fixed to the inner wall of the pipe with the use of a self-propelled wagon adapted to move through the pipe.

As an information oriented society is expanding rapidly in the recent years, requirements for further expansion of information communication means have been raised by users. It is being recognized that further expansion of information communication means is a problem to be resolved within a short period of time in not only metropolitan areas but also in suburbs and under these circumstances attention is paid to new communication means, for instance, optical communication cable. In practice, the latter is put in actual use for various kinds of communication.

These new communication cables are often laid along the inner wall of a pipe having a relatively large inner diameter such as main sewage pipes or the like. In this case each of the cables is manually fixed to the inner wall of a pipe by using clasps or the like means. However, due to a tendency of quick expansion of demand for communication cables it becomes difficult to satisfactorily meet the requirement merely by utilizing conventional main sewage pipe or the like. Of course, it is one idea that expansion of laying area of communication cables is achieved by provision of common utility trenches or the like arranged specially for the purpose of communication but new provision of such trenches or the like requires a huge amount of expenditure.

OBJECT AND SUMMARY OF THE INVENTION

Hence, the present invention has been made with the foregoing background in mind and its object is to provide a method and apparatus for laying communication cable along the inner wall of a pipe having a relatively small inner diameter such as sewage branch pipe or the like which is already existent.

To accomplish the above object, there is proposed according to one aspect of the present invention a method of laying cable in a pipe comprising the steps of previously introducing the cable into the pipe in which the cable is to be laid, causing a wagon to move through the pipe, raising up the cable with the aid of an arm disposed at the fore part of the wagon until the cable abuts against the inner wall of the pipe at a predetermined position, and fixing the cable to the inner wall of the pipe by using fixing means disposed at the rear part of the wagon.

Further, there is proposed according to other aspect of the present invention, an apparatus for laying cable in a pipe of the type in which the cable is previously introduced into the pipe and it is fixed to the inner wall of the pipe, wherein the apparatus comprises a wagon adapted to move through the pipe, an arm disposed at the fore part of the wagon to thrust the cable against the inner wall of the pipe at a predetermined position by raising up the cable, and fixing means disposed at the rear part of the wagon to fix the cable to the inner wall of the pipe.

When the method and apparatus of the invention as mentioned above are employed, the wagon is caused to move through the pipe, the cable which has previously introduced into the pipe is raised up with the aid of the arm disposed at the fore part of the wagon until it abuts against the inner wall of the pipe at a predetermined position, and thereafter the cable is fixed to the inner wall of the pipe by operating fixing means disposed at the rear part of the wagon.

To facilitate understanding of the present invention the latter will be described later with respect to the case where a cable is fixedly secured to a sewage branch pipe.

Other objects, features and advantages of the present invention will become readily apparent from reading of the following description which has been prepared in conjunction with the accompanying drawings.

BRIEF DESCRIPTION OF THE DRAWINGS

The present invention will be illustrated in the following drawings in which.

DETAILED DESCRIPTION OF PREFERRED EMBODIMENTS

Now, the present invention will be described in a greater detail hereunder with reference to the accompanying drawings which illustrate preferred embodiments thereof.

Figure 1:
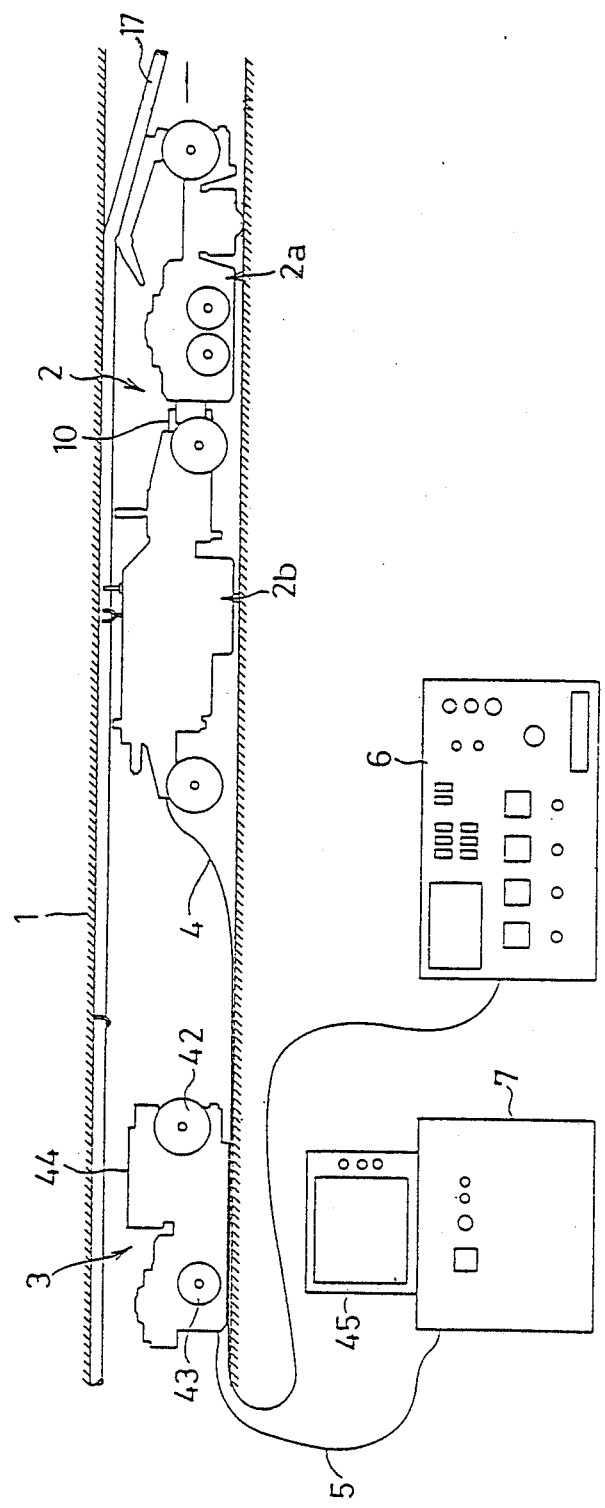
FIG. 1 is a schematic side view of an apparatus for laying an optical communication cable along the inner wall of a sewage branch pipe in accordance with an embodiment of the present invention.

FIG. 1 is a schematic view illustrating arrangement of an apparatus for laying a cable in a pipe in accordance with the present invention. In the drawing reference numeral 1 denotes a sewage branch pipe. This pipe 1 comprises a hume pipe or ceramic pipe having a relatively small inner diameter, for instance, an inner diameter of 250 mm. As is apparent from the drawing, the pipe 1 has a main wagon 2 and a watching wagon 3 inserted therein and both the main wagon 2 and the watching wagon 3 are electrically connected to control units 6 and 7 via control cables 4 and 5, the control units 6 and 7 being installed outside the pipe 1. Incidentally, the pipe 1 extends between adjacent man holes (not shown) having an inner diameter of about 600 mm spaced away from one another by a predetermined distance and the main wagon 2 and the watching wagon 3 are inserted into the pipe 1 by way of this manhole.

Specifically, the main wagon 2 is constructed by a combination of a leading wagon 2a and a laying wagon 2b which are connected to one another with the use of a joint 10. The reason why the main wagon 2 is divided into two units consists in that the main wagon 1 can be easily inserted into the interior of the pipe 1. The leading wagon 2a and the laying wagon 2b are jointed to one another at the inlet portion of the pipe 1.

Figure 2:
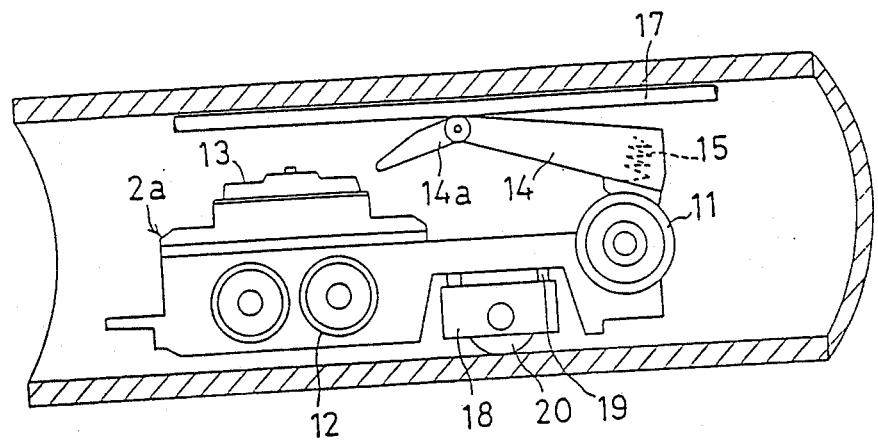
FIG. 2 is a fragmental enlarged side view of the apparatus in FIG. 1, particularly illustrating a leading wagon.
Figure 3:
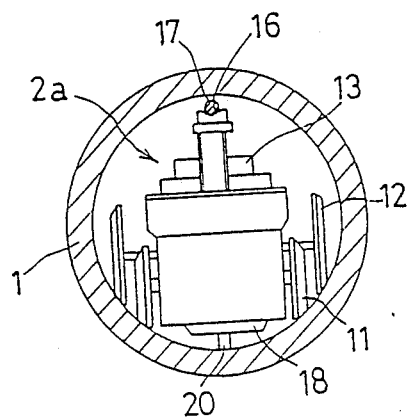
FIG. 3 is a front view of the leading wagon in FIG. 2.

As shown in FIGS. 2 and 3, the leading wagon 2a includes a pair of fore wheel 11 and two pair of rear driving wheels 12 which are rotated by a motor 13.

Incidentally, as is apparent from FIG. 3, both the fore and rear wheels 11 and 12 contact with the wall surface of the pipe 1 at the position located appreciably above the bottom of the inner wall thereof and an occurrence of rolling of the leading wagon 2a is inhibited by locating the center of gravity of the leading wagon 2a in the vicinity of the contact position as mentioned above.

The leading wagon 2a is provided with a turnable arm 14 at the fore part thereof which is adapted to turn up and down. The fore end part 14a of the arm 14 extends rearwardly and it is normally urged upwardly under the effect of resilient force of a spring 15. As shown in FIG. 3, the fore end part 14a of the arm 14 is formed with a V-shaped recess 16 on the upper surface thereof. An optical communication cable 17 is previously introduced into the interior of the pipe 1 and it is received in the recess 16 on the arm 14. Thereafter, it is raised up by the arm 14 until it abuts against the upper part of the inner wall of the pipe 1.

The leading wagon 2a is equipped with a rotary encoder 18 at the lower part thereof. The rotary encoder 18 is attached to the leading wagon 2a so as to move in the vertical direction along guide rods 19 and moreover it is normally urged downwardly with the aid of resilient means which are not shown in the drawing. By virtue of this arrangement of the encoder 18, a roller 20 of the encoder 18 abuts against the bottom of the inner wall of the pipe 1 whereby the roller 20 is caused to rotate as the leading wagon 2a moves forward. Thus, a travelling distance of the leading wagon 2a is detected by means of the encoder 18 and it is input into the control unit 6 by way of the control cable 4.

Figure 4:
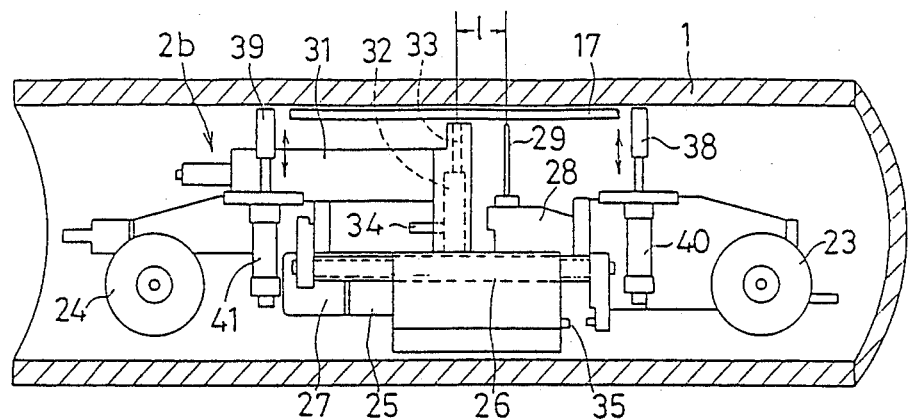
FIG. 4 is a fragmental enlarged side view of the apparatus in FIG. 1, particularly illustrating a laying wagon.
Figure 5:
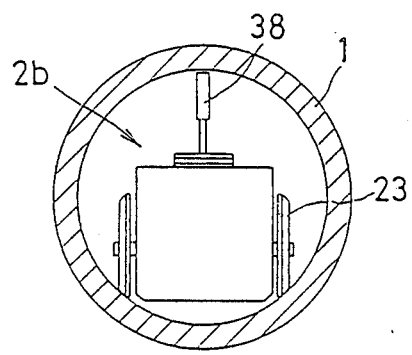
FIG. 5 is a front view of the laying wagon in FIG. 4.

On the other hand, as shown in FIGS. 4 and 5, the laying wagon 2b is provided with a pair of fore wheels 23 and a pair of rear wheels 24. Both the fore and rear wheels 23 and 24 come in contact with the wall surface of the pipe 1 at the position located appreciably above the bottom of the inner wall thereof in the same manner as in the case of the leading wagon 2a and any tendency of the laying wagon 2b to roll is prevented by locating the center of gravity of weight of the laying wagon 2b in the vicinity of the contact position as mentioned above.

The laying wagon 2b is provided with a moving platform 25 adapted to move forward and rearward. The moving platform 25 is threadably engaged to a screw rod 26 so that the moving platform 25 moves forward and rearward (rightward and leftward as seen in FIG. 4) as the screw rod 26 is rotated by a motor 27. The moving platform 25 is provided with a lifting platform 28 which is movable in the vertical direction and the lifting platform 28 is equipped with a pair of drills 29 (Only one of them is shown in FIG. 4 due to their overlapping as seen in the direction at a right angle relative to a plane of the paper.). Thus, a pair of holes are drilled on the inner wall of the pipe 1 when the lifting platform 28 is raised.

Further, the moving platform 25 is provided with a holder magazine 31 and a striker 32 at the position located behind the drills 29 (located leftwardly of the drills 29 as seen in FIG. 4). The holder magazine 31 has a plurality of U-shaped holders 33 accommodated therein. Each of the holders 33 is intended to fixedly secure the cable 17 to the inner wall of the pipe 1 and they are driven upwardly one by one by means of the striker 32.

Incidentally, the striker 32 is so constructed that it is actuated in the vertical direction by operating a pneumatic cylinder which is not shown in the drawing. It should be noted that the upper limit of upward movement of the striker is defined by means of a stopper 34.

A distance l between the drills 29 and the striker 32 is determined to be equal to a stroke of the moving platform 25 and arranged so that feet of a holder 33 driven at the forward position of the moving platform 25 are exactly press fit in drilled holes which are formed on the inner wall of the pipe 1 at the rearward position of the moving platform 25. Incidentally, the forward position of the moving platform 25 is restricted by means of a stopper 35.

Further, the laying wagon 2b is equipped with a pair of clamps 38 and 39 at the fore and rear parts thereof. The pair of clamps 38 and 39 are so constructed that they are raised or lowered by actuating pneumatic cylinders 40 and 41, and the laying wagon 2b is immovably held relative to the pipe 1 by allowing the clamps 38 and 39 to be raised up until they come in press contact with the inner wall of the pipe 1.

Next, the watching wagon 3 is provided with a pair of fore wheels 42 and a pair of rear driving wheels 43 and both the fore and rear wheels 42 and 43 come in contact with the wall surface of the pipe 1 at the position located appreciably above the bottom of the inner wall of the pipe 1. Thus, rolling of the watching wagon 3 is prevented by constructing the latter in the same manner as the laying wagon 2b. The watching wagon 3 has a monitor camera 44 mounted thereon so that the existent state of the interior of the pipe 1 is projected on a monitor television 45 of the control unit 7.

The apparatus of the present invention installed in the pipe 1 is constructed in the above-described manner and laying of the optical communication cable 17 is effected in accordance with the following order by operating the apparatus.

First, a wagon similar to the leading wagon 2a is inserted into the end part of the sewage branch pipe 1 by way of a manhole and the one end of the cable 17 is connected to the first-mentioned wagon. Then, the wagon is caused to move toward the innermost end of the pipe 1 while the cable 17 is drawn. By continuing movement of the wagon the cable is increasingly introduced into the pipe 1.

On completion of introduction of the cable 17, the leading wagon 2a is inserted into the end part of the pipe 1 and thereafter the laying wagon 2b is jointed to the rear end of the leading wagon 2a so that it is inserted into the interior of the pipe 1. At this moment the cable 17 is placed on the arm 14 of the leading wagon 2a.

Next, the leading wagon 2a and the laying wagon 2b are caused to move forward by operating the control unit 6 and their movement is stopped when they have moved forward by a predetermined distance.

Next, the pair of clamps 38 and 39 are raised up by actuating pneumatic cylinders 40 and 41 whereby they come into pressure contact with the upper part of the inner wall of the pipe 1. This causes the laying wagon 2b to be immovably held relative to the pipe 1. As a result, dislocation of the laying wagon 2b is prevented. After the laying wagon 2b is held immovably, the moving platform 25 is displaced rearwardly in the leftward direction as seen in FIG. 4 and thereafter the lifting platform 28 is raised up while rotating the pair of drills 29. Thus, a pair of drilled holes are formed at the upper part of the inner wall of the pipe 1. It should be noted that the cable 17 extends at the position between the pair of drills 29 so that drilled holes are formed on both the sides of the cable 17.

After the drilled holes having a predetermined depth are formed, the moving platform 25 is displaced forward in the rightward direction as seen in FIG. 4 and the striker 32 is then raised up. As the striker 32 is raised up, one of holders 33 accommodated in the holder magazine 32 is pushed upwardly and a pair of feet of the holder 33 are press fit into the pair of drilled holes. Since the forward position of the moving platform 25 is exactly located by means of the stopper 35, the result is that the feet of the holder 33 are exactly press fit in the drilled holes.

Figure 6:
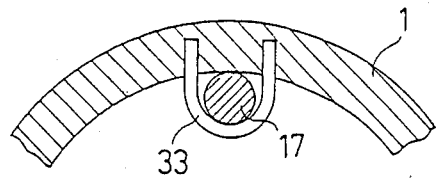
FIG. 6 is a fragmental enlarged cross-sectional view of the pipe, particularly illustrating that the optical communication cable is fixed to the inner wall of the pipe by means of an U-shaped holder which is driven into the wall structure of the pipe.

When the feet of the holder 33 are driven into the drilled holes in that way, the cable 17 is fixedly secured to the inner wall of the pipe 1 by means of the holder 33, as shown in FIG. 6. After firm securing of the cable 17 is completed at one position, the striker 32 is lowered and thereafter the moving platform 25 is displaced to the original rearward position. Next, both the leading wagon 2a and the laying wagon 2b are caused to move forward by a predetermined distance so that the above-described operations are repeated.

The cable 17 is successively fixed to the inner wall of the pipe 1 in the above-described manner. When it is required that the state of firm securing of the cable 17 is confirmed, the watching wagon 3 is inserted into the pipe 1 after completion of securing operation and thereafter it is caused to move forward so that the state of the interior of the pipe 1 is inspected by viewing the monitor television 45.

While the present invention has been described above with respect to a preferred embodiment thereof, it should of course be understood that it should not be limited only to this but various changes or modifications may be made in a suitable manner without departure from the scope of the invention. In the foregoing embodiment the main wagon 2 is constructed by a combination of the leading wagon 2a and the laying wagon 2b which are jointed to one another. However, in the case where the pipe 1 is connected to manholes having a large inner diameter it is possible to construct both the leading wagon 2a and the laying wagon 2b in an integral structure.

Figure 7:
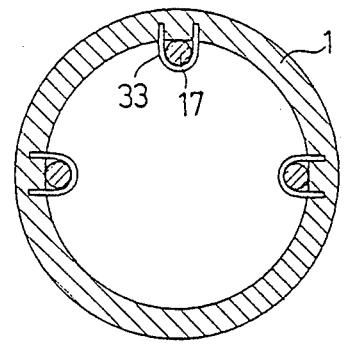
FIG. 7 is a cross-sectional view of the pipe, particularly illustrating three optical communication cables fixed to the pipe with the use of the apparatus in accordance with other embodiment of the present invention.
Figure 8:
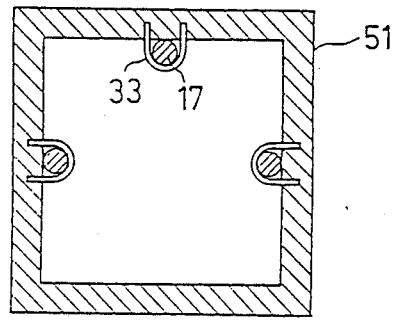
FIG. 8 is a cross-sectional view of a square pipe, particularly illustrating that three optical communication cables are fixed to the pipe with the use of the apparatus in accordance with another embodiment of the present invention.

Further, in the foregoing embodiment the present invention is applied to the case where an optical communication cable 17 is laid. However, the kind of cable should not be limited only to this but the present invention may be applied to the case where a conventional telephone cable is laid. Further, it is possible to lay a plurality of cables 17 in the pipe 1, as shown in FIG. 7. Further, the present invention should not be limited only to a sewage branch pipe 1 but it may be applied to the case where a cable is laid in other kind of pipe. For instance, it is possible to lay cables 17 in a pipe 51 having a square cross-sectional shape, as shown in FIG. 8. Further, in the foregoing embodiment the cable 17 is fixedly secured to the inner wall of the pipe 1 with the use of holders 33. However, a method of immovably holding the cable 17 should not be limited only to usage of the holders but other method of immovably holding it may be employed.

As will be apparent from the above description, the present invention is practiced in such a manner that a main wagon is caused to move through a pipe, a cable which has been previously introduced into the pipe is thrust against the inner wall of the pipe at a predetermined position with the aid of an arm disposed at the fore part of the main wagon and the cable is then fixed to the inner wall of the pipe by actuating fixing means disposed at the rear part of the main wagon. In consequence, laying of a cable in the pipe can be effected automatically. Particularly, it is possible to lay a cable in a pipe having a small inner diameter into which anyone can not enter. Accordingly, the present invention can realize expansion of information communication means effectively at a reduced cost.

We claim:

1. An apparatus for laying a cable in a pipe of the kind that fixes a cable already introduced into the pipe to the inner wall of the pipe, said apparatus comprising:
   (a) a wagon adapted to move forward along the pipe interior;
   (b) an arm disposed at a forward part of said wagon for raising and thrusting the cable against the inner wall of the pipe at predetermined positions:
   (c) fixing means disposed at the rear part of said wagon for fixing the raised cable onto the inner wall of the pipe;
   (d) means for controlling all functions of said wagon from the outside of the pipe;

said wagon having propelling means on either side thereof, and said propelling means being constructed for engagement with the inner wall of the pipe at positions higher than a bottom of said pipe so as to prevent said wagon from rolling about the pipe axis.

2. An apparatus according to claim 1 wherein said wagon comprises leading and laying wagons that are connected to each other in tandem, said leading wagon having said arm for thrusting the cable against the inner wall of the pipe, and said laying wagon having said fixing means.

3. An apparatus for laying cable in a pipe of the kind that fixes a cable already introduced into the pipe to the inner wall of the pipe, said apparatus comprising:
   (a) a wagon adapted to move forward along the pipe interior;
   (b) an arm disposed at a forward part of said wagon for progressively raising and thrusting successive longitudinal cable portions against the inner wall of the pipe at predetermined positions along the pipe;
   (c) fixing means disposed at the rear part of said wagon operable subsequently to the cable raising arm for fixing the raised cable onto the inner wall of the pipe by driving cable holders successively into the inner wall at intervals along the cable length about the respective cable portions thrust against the inner wall and;
   (d) means for controlling all functions of said wagon from the outside of the pipe;

said wagon having propelling means on opposite sides thereof constructed for engagement with the inner wall of the pipe at positions higher than a bottom of said pipe so as to prevent said wagon from rolling about the pipe axis.

* * * * *

UNITED STATES PATENT AND TRADEMARK OFFICE
CERTIFICATE OF CORRECTION

PATENT NO. : 4,822,211
DATED : April 18, 1991
INVENTOR(S) : Shinoda, et al

It is certified that error appears in the above-identified patent and that said Letters Patent is hereby corrected as shown below:

In addition to the assignee as indicated on the title page, please add the following:

Tokyo Metropolitan, Japan
Tokyo Metropolitan Sewerage Service Corporation, Japan Signed and Sealed this Third Day of November, 1992

*Attest:*

DOUGLAS B. COMER

*Attesting Officer*     *Acting Commissioner of Patents and Trademarks*